(12) United States Patent
Staats

(10) Patent No.: US 8,250,100 B2
(45) Date of Patent: Aug. 21, 2012

(54) GENERAL PURPOSE DATA CONTAINER METHOD AND APPARATUS FOR IMPLEMENTING AV/C DESCRIPTORS

(75) Inventor: Erik P. Staats, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 12/536,959

(22) Filed: Aug. 6, 2009

(65) Prior Publication Data

US 2010/0070840 A1    Mar. 18, 2010

Related U.S. Application Data

(63) Continuation of application No. 10/660,945, filed on Sep. 12, 2003, now Pat. No. 7,574,650, which is a continuation of application No. 09/429,233, filed on Oct. 28, 1999, now Pat. No. 6,691,096.

(51) Int. Cl.
*G06F 17/30* (2006.01)
*G06F 7/00* (2006.01)
*G06F 17/00* (2006.01)

(52) U.S. Cl. .................. 707/791; 715/201

(58) Field of Classification Search .......... 707/791, 707/999.1; 715/201
See application file for complete search history.

(56) References Cited

U.S. PATENT DOCUMENTS

| | | | |
|---|---|---|---|
| 4,156,798 A | 5/1979 | Doelz | |
| 4,194,113 A | 3/1980 | Fulks et al. | |
| 5,014,262 A | 5/1991 | Harshavardhana | |
| 5,274,631 A | 12/1993 | Bhardwaj | |
| 5,343,461 A | 8/1994 | Barton et al. | |
| 5,394,556 A | 2/1995 | Oprescu | |
| 5,406,643 A | 4/1995 | Burke et al. | |
| 5,452,330 A | 9/1995 | Goldstein | |
| 5,490,253 A | 2/1996 | Laha et al. | |
| 5,495,481 A | 2/1996 | Duckwall | |
| 5,524,254 A | 6/1996 | Morgan et al. | |
| 5,539,390 A | 7/1996 | Nagano et al. | |
| 5,541,670 A | 7/1996 | Hanai | |
| 5,568,641 A | 10/1996 | Nelson et al. | |
| 5,583,922 A | 12/1996 | Davis et al. | |
| 5,621,659 A | 4/1997 | Matsumoto et al. | |
| 5,630,173 A | 5/1997 | Oprescu | |
| 5,632,016 A | 5/1997 | Hoch et al. | |

(Continued)

FOREIGN PATENT DOCUMENTS

EP    1 085 706    3/2001

(Continued)

OTHER PUBLICATIONS

Bregni et al., Jitter Testing Technique and Results at VC-4 Desynchronizer Output of SDH Equipment, IEEE International Conference on Communications, vol. 3, pp. 1407-1410, May 12, 1994.

(Continued)

*Primary Examiner* — Kimberly Wilson
(74) *Attorney, Agent, or Firm* — Gazdzinski & Associates, PC

(57) ABSTRACT

Disclosed herein is a data management system for AV/C descriptor data. The system includes a data container hierarchical structure. The system also includes a methodology for compiling data from the containers into a read buffer upon receipt of a request from a requestor. The data presented to the requestor will preferably be in a format that may be understood by other device requestors that may or may not be utilizing this same container system.

38 Claims, 10 Drawing Sheets

U.S. PATENT DOCUMENTS

| | | | |
|---|---|---|---|
| 5,640,595 A | 6/1997 | Baugher et al. | |
| 5,642,515 A | 6/1997 | Jones et al. | |
| 5,654,657 A | 8/1997 | Pearce | |
| 5,684,715 A | 11/1997 | Palmer | |
| 5,701,476 A | 12/1997 | Fenger | |
| 5,701,492 A | 12/1997 | Wadsworth et al. | |
| 5,706,278 A | 1/1998 | Robillard et al. | |
| 5,712,834 A | 1/1998 | Nagano et al. | |
| 5,719,862 A | 2/1998 | Lee et al. | |
| 5,754,765 A | 5/1998 | Danneels et al. | |
| 5,784,648 A | 7/1998 | Duckwall | |
| 5,793,980 A | 8/1998 | Glaser et al. | |
| 5,802,048 A | 9/1998 | Duckwall | |
| 5,802,057 A | 9/1998 | Duckwall et al. | |
| 5,802,365 A | 9/1998 | Kathail et al. | |
| 5,805,073 A | 9/1998 | Nagano et al. | |
| 5,809,331 A | 9/1998 | Staats et al. | |
| 5,826,027 A | 10/1998 | Pedersen et al. | |
| 5,832,298 A | 11/1998 | Sanchez et al. | |
| 5,835,761 A | 11/1998 | Ishii et al. | |
| 5,845,152 A | 12/1998 | Anderson et al. | |
| 5,867,730 A | 2/1999 | Leyda | |
| 5,875,301 A | 2/1999 | Duckwall et al. | |
| 5,886,732 A | 3/1999 | Humpleman | |
| 5,917,835 A | 6/1999 | Barrett et al. | |
| 5,923,663 A | 7/1999 | Bontemps et al. | |
| 5,930,480 A | 7/1999 | Staats | |
| 5,935,208 A | 8/1999 | Duckwall et al. | |
| 5,938,764 A | 8/1999 | Klein | |
| 5,940,600 A | 8/1999 | Staats et al. | |
| 5,954,796 A | 9/1999 | McCarty et al. | |
| 5,968,152 A | 10/1999 | Staats | |
| 5,969,283 A | 10/1999 | Looney et al. | |
| 5,970,052 A | 10/1999 | Lo et al. | |
| 5,987,605 A | 11/1999 | Hill et al. | |
| 5,991,842 A | 11/1999 | Takayama | |
| 6,005,861 A | 12/1999 | Humpleman | |
| 6,032,202 A | 2/2000 | Lea et al. | |
| 6,032,261 A | 2/2000 | Hulyalkar | |
| 6,038,234 A | 3/2000 | LaFollette et al. | |
| 6,038,625 A | 3/2000 | Ogino et al. | |
| 6,070,187 A | 5/2000 | Subramaniam et al. | |
| 6,073,206 A | 6/2000 | Piwonka et al. | |
| 6,091,726 A | 7/2000 | Crivellari et al. | |
| 6,115,764 A | 9/2000 | Chisholm et al. | |
| 6,122,248 A | 9/2000 | Murakoshi et al. | |
| 6,131,129 A | 10/2000 | Ludtke et al. | |
| 6,131,134 A | 10/2000 | Huang et al. | |
| 6,133,938 A | 10/2000 | James | |
| 6,138,196 A | 10/2000 | Takayama et al. | |
| 6,141,702 A * | 10/2000 | Ludtke et al. | 710/5 |
| 6,141,767 A | 10/2000 | Hu et al. | |
| 6,145,018 A | 11/2000 | LaFollette et al. | |
| 6,157,972 A | 12/2000 | Newman et al. | |
| 6,160,796 A | 12/2000 | Zou | |
| 6,167,532 A | 12/2000 | Wisecup | |
| 6,173,327 B1 | 1/2001 | De Borst et al. | |
| 6,182,094 B1 | 1/2001 | Humpleman et al. | |
| 6,192,189 B1 | 2/2001 | Fujinami et al. | |
| 6,199,119 B1 | 3/2001 | Duckwall et al. | |
| 6,202,210 B1 | 3/2001 | Ludtke | |
| 6,212,171 B1 | 4/2001 | LaFollette et al. | |
| 6,212,633 B1 | 4/2001 | Levy et al. | |
| 6,219,697 B1 | 4/2001 | Lawande et al. | |
| 6,232,539 B1 | 5/2001 | Looney et al. | |
| 6,233,615 B1 | 5/2001 | Van Loo | |
| 6,233,624 B1 | 5/2001 | Hyder et al. | |
| 6,243,778 B1 | 6/2001 | Fung et al. | |
| 6,247,063 B1 | 6/2001 | Ichimi et al. | |
| 6,247,083 B1 | 6/2001 | Hake et al. | |
| 6,253,114 B1 | 6/2001 | Takihara | |
| 6,253,255 B1 | 6/2001 | Hyder et al. | |
| 6,260,063 B1 | 7/2001 | Ludtke et al. | |
| 6,266,334 B1 | 7/2001 | Duckwall | |
| 6,266,344 B1 | 7/2001 | Fujimori et al. | |
| 6,266,701 B1 | 7/2001 | Sridhar et al. | |
| 6,275,889 B1 | 8/2001 | Saito | |
| 6,282,597 B1 | 8/2001 | Kawamura | |
| 6,292,840 B1 | 9/2001 | Blomfield-Brown et al. | |
| 6,295,479 B1 | 9/2001 | Shima et al. | |
| 6,308,222 B1 | 10/2001 | Krueger et al. | |
| 6,311,228 B1 | 10/2001 | Ray | |
| 6,314,461 B2 | 11/2001 | Duckwall et al. | |
| 6,343,321 B2 | 1/2002 | Patki et al. | |
| 6,345,315 B1 | 2/2002 | Mishra | |
| 6,347,362 B1 | 2/2002 | Schoinas et al. | |
| 6,353,868 B1 | 3/2002 | Takayama et al. | |
| 6,356,558 B1 | 3/2002 | Hauck et al. | |
| 6,363,085 B1 | 3/2002 | Samuels | |
| 6,373,821 B2 | 4/2002 | Staats | |
| 6,385,679 B1 | 5/2002 | Duckwall et al. | |
| 6,405,247 B1 | 6/2002 | Lawande et al. | |
| 6,411,628 B1 | 6/2002 | Hauck et al. | |
| 6,418,150 B1 | 7/2002 | Staats | |
| 6,425,019 B1 | 7/2002 | Tateyama et al. | |
| 6,426,062 B1 | 7/2002 | Chopra et al. | |
| 6,442,630 B1 | 8/2002 | Takayama et al. | |
| 6,446,142 B1 | 9/2002 | Shima et al. | |
| 6,452,975 B1 | 9/2002 | Hannah | |
| 6,457,086 B1 | 9/2002 | Duckwall | |
| 6,466,982 B1 | 10/2002 | Ruberg | |
| 6,496,862 B1 | 12/2002 | Akatsu et al. | |
| 6,513,085 B1 | 1/2003 | Gugel et al. | |
| 6,519,657 B1 | 2/2003 | Stone et al. | |
| 6,529,522 B1 | 3/2003 | Ito et al. | |
| 6,546,419 B1 | 4/2003 | Humpleman et al. | |
| 6,587,904 B1 | 7/2003 | Hauck et al. | |
| 6,591,300 B1 | 7/2003 | Yurkovic | |
| 6,606,320 B1 | 8/2003 | Nomura et al. | |
| 6,618,750 B1 | 9/2003 | Staats | |
| 6,618,785 B1 | 9/2003 | Whitby-Streves | |
| 2001/0001151 A1 | 5/2001 | Duckwall et al. | |
| 2001/0019561 A1 | 9/2001 | Staats | |
| 2001/0024423 A1 | 9/2001 | Duckwall et al. | |
| 2002/0057655 A1 | 5/2002 | Staats | |
| 2002/0085581 A1 | 7/2002 | Hauck et al. | |
| 2002/0101231 A1 | 8/2002 | Staats | |
| 2002/0103947 A1 | 8/2002 | Duckwall et al. | |
| 2002/0188780 A1 | 12/2002 | Duckwall | |
| 2002/0188783 A1 | 12/2002 | Duckwall et al. | |
| 2003/0037161 A1 | 2/2003 | Duckwall et al. | |
| 2003/0055999 A1 | 3/2003 | Duckwall et al. | |

FOREIGN PATENT DOCUMENTS

| | | |
|---|---|---|
| EP | 1 085 706 | 10/2002 |

OTHER PUBLICATIONS

"Information technology—Microprocessor systems—Control and Status Registers (CSR) Architecture for microcomputer buses", ANSI/IEEE Standard 1212, The Institute of Electrical and Electronics Engineers, Inc. pp. 1-122, 1994 Edition.

Bregni et al., Jitter Testing Technique and Results at VC-4 Desynchronizer Output of SDH Equipment, IEEE Transactions on Instrumentation and Measurement, vol. 44, Issue 3, pp. 675-678, Jun. 1995.

"IEEE Standard for a High Performance Serial Bus", IEEE Standard 1394-1995, The Institute of Electrical and Electronics Engineers, Inc., pp. I-384, approved Jul. 22, 1996.

Shiwen et al., Parallel Positive Justification in SDH C.sub.-4 Mapping, IEEE International Conference on Communications, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", P1394a Draft 3.0, The Institute of Electrical and Electronics Engineers, Inc., pp. 1-187, Jun. 30, 1999.

"IEEE Standard for a High Performance Serial Bus-Amendment 1", The Institute of Electrical and Electronics Engineers, Inc., pp. 1-196, approved Mar. 30, 2000.

P1394b Draft Standard for a High Performance Serial Bus (High Speed Supplement) P1394b Draft 1.3.3, The Institute of Electrical and Electronics Engineers, Inc., pp. 1-408, Nov. 16, 2001.

* cited by examiner

GENERAL PURPOSE DATA CONTAINER METHOD AND APPARATUS FOR IMPLEMENTING AV/C DESCRIPTORS

CROSS REFERENCE TO RELATED APPLICATIONS

This application is a continuation of and claims priority to U.S. patent application Ser. No. 10/660,945 of the same title filed Sep. 12, 2003 to be issued as U.S. Pat. No. 7,574,650, which is a continuation of U.S. patent application Ser. No. 09/429,233, filed Oct. 28, 1999, now issued as U.S. Pat. No. 6,691,096.

BACKGROUND OF THE INVENTION

1. Field of the Invention

This invention relates to audio/video control (AV/C) implementations. More particularly, this invention relates to providing a methodology for accessing and interacting with AV/C descriptors within the standards of the AV/C Digital Interface Command Set General Specification.

2. The Prior Art

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbytes/second. Most consumer electronic devices available on the market have supported either 100 or 100/200 Mbytes/second; meaning that plenty of headroom remains in the 1394 specification. However, as more devices are added to a system, and improvements in the quality of the A/V data (i.e., more pixels and more bytes per pixel) emerge, a need for greater bandwidth has been indicated.

The 1394a specification (pending approval) offers efficiency improvements, including support for very low power, arbitration, acceleration, fast reset and suspend/resume features. The AV/C Digital Interface Command Set General Specification defines a command set for consumer and professional audio/video equipment over the IEEE Std. 1394-1995. Within the standard, audio/video devices are implemented as a common unit architecture within IEEE Std. 1394-1995.

Furthermore, the AV/C Digital Interface Command Set General Specification defines a set of data structures called AV/C descriptors used to provide useful information about an AV/C device and its media content. In providing useful information about an AV/C device, AV/C descriptors are similar to 1212 CSR Configuration ROMs.

Referring now to FIG. 1, a flowchart of an interpretation of the AV/C General Specification descriptor hierarchy is depicted. The following excerpt from the AV/C Digital Interface Command Set General Specification, Rev. 3.0 (the General Specification) summarizes this architecture.

The AV/C descriptor mechanism supports the creation of various data structures, both static and dynamic, which contain useful information about AV/C units, subunits, and their associated components such as plugs. Additionally, these structures can be used to model the media contents provided by these subunits.

The structures can be combined to form a content navigation and selection mechanism, which allows controllers to discover and access all media contents in a general way, limiting the media-, and subunit-type specific knowledge required to perform such tasks.

These structures are applicable to any type of unit and subunit definitions of the AV/C protocol.

A descriptor is an address space on a target that contains attributes or other descriptive information. One example is the subunit identifier descriptor, which is a data block containing various pieces of information regarding a particular type of subunit. The format and contents of the subunit identifier descriptor are unique to each type of subunit. For example, all tuner subunits will have the same kind of subunit identifier descriptor. Most of the information in this structure is static in nature. However, depending on the type of subunit and the particular technologies that it implements, it is possible that some of the information may change from time to time.

Other standard descriptor structures include an object list and the object entries that it contains. An object is a generic concept that applies to a particular type of subunit, which can be defined as needed. For example, a tuner subunit implements an object list, which contains information about the various services, which are available on the system. Each service is represented by an object.

Other examples of where objects may be useful might be for disc players, where the objects represent tracks on the media. For digital still cameras, objects could be the pictures that have been taken.

An object list is a generic container concept; each entry in the list is an object descriptor structure. These may also be referred to as object entries, or simply, objects.

Objects and object lists can be used to model data relationships where one entity is composed of several sub-entities. For example, an audio compact disc (CD) can be composed of the collection of audio tracks on that disc.

In the above example, an object would be used to describe the CD. That object would, in turn, have a reference to a list of objects, where each one represents an audio track. Further extending the example, a collection of several CD's can be represented by a list, where each object entry describes one of those CD's.

The hierarchical model of lists and objects can be continued to any arbitrary level of complexity.

We define the root or beginning of a hierarchy to be a list, which may contain one or more objects. This list will be accessible by its list_ID value, which can be found in the subunit identifier descriptor. A subunit identifier descriptor may refer to several root lists.

When traversing away from the root, we say that we are moving down in the hierarchy. Conversely, when moving toward the root, we are moving up in the hierarchy. There is only one root for the hierarchy, and there may be any number of leaf nodes (end points).

When an object entry has object lists associated with it, we say that the object entry is a parent. The object list that it refers to is a child.

So, object lists, which are referred to by the subunit identifier descriptor, are root lists; all other lists, which must be referred to by objects within other lists, are child lists. Object lists and object entries are defined per subunit type (tuner, etc.). There may or may not be crossover usage in other subunit types, depending on the definitions.

The unit and subunit identifier descriptors mentioned in this document are examples of descriptor structures; objects and object lists are also descriptors. When a controller wants to access a descriptor, it will use the descriptor commands to specify which descriptor it wants to deal with.

One very important fact to understand is that the structures of the various descriptors defined here are for interfacing purposes, where two separate AV/C entities (a target and a controller) must exchange information. The internal storage strategy used by a particular entity is completely transparent to these interface definitions. Data can be stored in any manner or location as required by the entity. Only when it comes time to present it to a controller will it be necessary to use these structure formats.

Thus, as may be gleaned from the above excerpt from the General Specification, in providing useful information about the media content of an AV/C device, AV/C descriptors are more similar to a networked file system. For example, AV/C descriptors are used to indicate the title of a MiniDisc in an AV/C MiniDisc player. Since MiniDiscs are writable, the disc title may be changed on the media, and AV/C descriptors are used to do so. In this case, then, AV/C descriptors may be both read and written. Thus, access to AV/C descriptors must be controlled as in a file system to prevent multiple controllers from simultaneously attempting to write to the same descriptor. Therefore, the AV/C descriptor architecture, generally, provides methods for opening access to descriptors, much like file systems do.

AV/C descriptors also provide status information such as the current amount of play time into a MiniDisc. This information is highly dynamic, changing as much as 10 times a second. Unlike other types of descriptors, status descriptors are not preconstructed in system memory and directly read when an AV/C controller reads the descriptor. Instead, the status descriptor information is read only when a descriptor read request is received. Typically, obtaining the status information involves calling a procedure which communicates with the disc mechanism controller.

The various types of descriptor information may be intermixed within the same descriptor structure. Thus, certain parts may be read only and others read/write, and some parts may be fairly static and directly accessed from memory while other parts are highly dynamic and must be obtained by calling a procedure.

Like the 1212 Configuration ROMs and file systems, AV/C descriptors are arranged in a hierarchical format. Each descriptor may have child descriptors. In a file system, each node in the hierarchy is accessed as a unit independent of its children. For example, opening access to a directory does not affect access to files within the directory. In addition, opening access to a directory allows reading of the contents of the directory but does not allow reading of the contents of the files within the directory. AV/C descriptors, however, do not provide the same treatment with regards to descriptor access. Opening access to an AV/C descriptor may also open access to many if not all of its children. In addition, opening access to an AV/C descriptor allows reading of both the descriptor and often its children. Thus, access to a descriptor may be opened by opening the descriptor itself, its parent, its parent's parent, and so forth.

Because of the AV/C descriptor access methods, an AV/C descriptor may be accessed as a whole unit or as a part of a parent descriptor. When an AV/C controller reads a descriptor, it specifies the starting address within the descriptor to begin reading. This descriptor "address space" depends upon how a descriptor is accessed. If a descriptor is accessed as a whole unit, the first field in the descriptor is located at address 0. However, if the descriptor is accessed as a part of its parent, the first field is not address 0, but another address. Thus, the fields within a descriptor are located at different addresses depending upon the type of descriptor access; descriptors, therefore, may have multiple address spaces.

Attempting to implement an AV/C descriptor as a whole is thus very difficult. Doing so may involve several types of data formats, storage and retrieval methods, access methods, and address spaces. The general specification implies attempting to implement each AV/C descriptor as a whole, leading to an implementation that is difficult to manage and different for each type of descriptor and device. The General Specification, however, leaves open the actual implementation methodologies and strategies to developers as long as the methodology or strategy stays within the parameters of the specification. That is, as long as when it comes time to present data to a controller, the prescribed structure is utilized. How this is implemented is not prescribed.

BRIEF DESCRIPTION OF THE INVENTION

This invention breaks down the AV/C descriptor structures into smaller components called containers. Using containers, the AV/C descriptor is decomposed into smaller, more manageable parts. Internally, each part contains descriptor information with the same data format, storage method, access method, and a single address space. However, each part may contain descriptor information with a data format, storage method, and access method that is different from the other parts. By combining multiple, simple containers, a more complex descriptor may be formed and thus, both comply with the AV/C General Specification and enable communication with legacy devices.

This system defines a structure referred to herein as an AV/C container. Each container may have an associated set of data and access methods. Container data may directly represent some data fields within an AV/C descriptor, may be an alternate representation of the AV/C descriptor data fields, or may contain information describing how to produce AV/C descriptor data fields (e.g., a register location where the current disc play time may be read).

The container access methods include procedures for reading and writing the container data in the AV/C descriptor format, opening access to the container, adding child containers, and notifying parent containers of changes to child containers. This system assigns to each container a single address space specific to that container. The first data field of each container begins at address zero (0). This system provides a method for remapping AV/C descriptor address spaces into AV/C container address spaces and back again. Rather than managing multiple address spaces for each descriptor, this system provides a method whereby only a single address space is managed for each container and a means for mapping from the various descriptor address spaces to the container address space.

To handle an AV/C descriptor read request, a read data buffer is created and the appropriate descriptor data fields are added sequentially into the read buffer. The set of descriptor data fields may come from multiple containers. When an AV/C descriptor read request is handled, the top level container for the specified descriptor is identified. The address space for the AV/C descriptor of the General Specification and the top level container of this system are the same (they both start at 00 00). The read buffer offset is initialized to zero (0), the current read address and length are initialized to the values specified in the read request, and the current container is initialized to the top level container. The descriptor read process then begins by reading the current container data which is the top level container.

The process to read the container checks whether the length of the container data is greater than the current address. If it is, the process computes the number of bytes to read from the container data. This will be the minimum of the container data length less the current address, or the current read request length. This amount of data is read from the container starting at the current address. This data is then copied into the read buffer at the current read buffer offset. Then, the read buffer offset and current address are incremented by the number of bytes read from the container, and the current read request length is decremented by the number of bytes read from the container. If the length of the container data is not greater than the current address, no data is read from the container.

Next, the current address is adjusted so that its value is appropriate for the address space of the next container to be read. This is accomplished by decrementing the current address by the length of the current container data. Thereafter, the process checks whether the current container has any children. If it does, the read container process is applied to each such available child container. Otherwise, the process continues with the parent container. If the parent has more children to read from, the read process continues with the parent's next child. Otherwise, the process continues with the parent's parent and back up to the top level parent container. The process, therefore, continues as needed, until all of the top-level container's children have been read. Put another way, the process continues until the requested amount of data is read or there are no more containers to read from.

Therefore it is a primary object of the present invention to provide a method for implementing an AV/C container architecture.

It is another object of the present invention to provide a method for recompiling AV/C descriptor data into a format which complies with the AV/C General Specification.

It is yet another object of the present invention to provide a memory manipulation system which allows for specified registry point manipulation, compilation, and recompilation.

These and other objects of the present invention will be made manifest when considering the following detailed specification when taken in conjunction with the appended drawing figures.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 2:
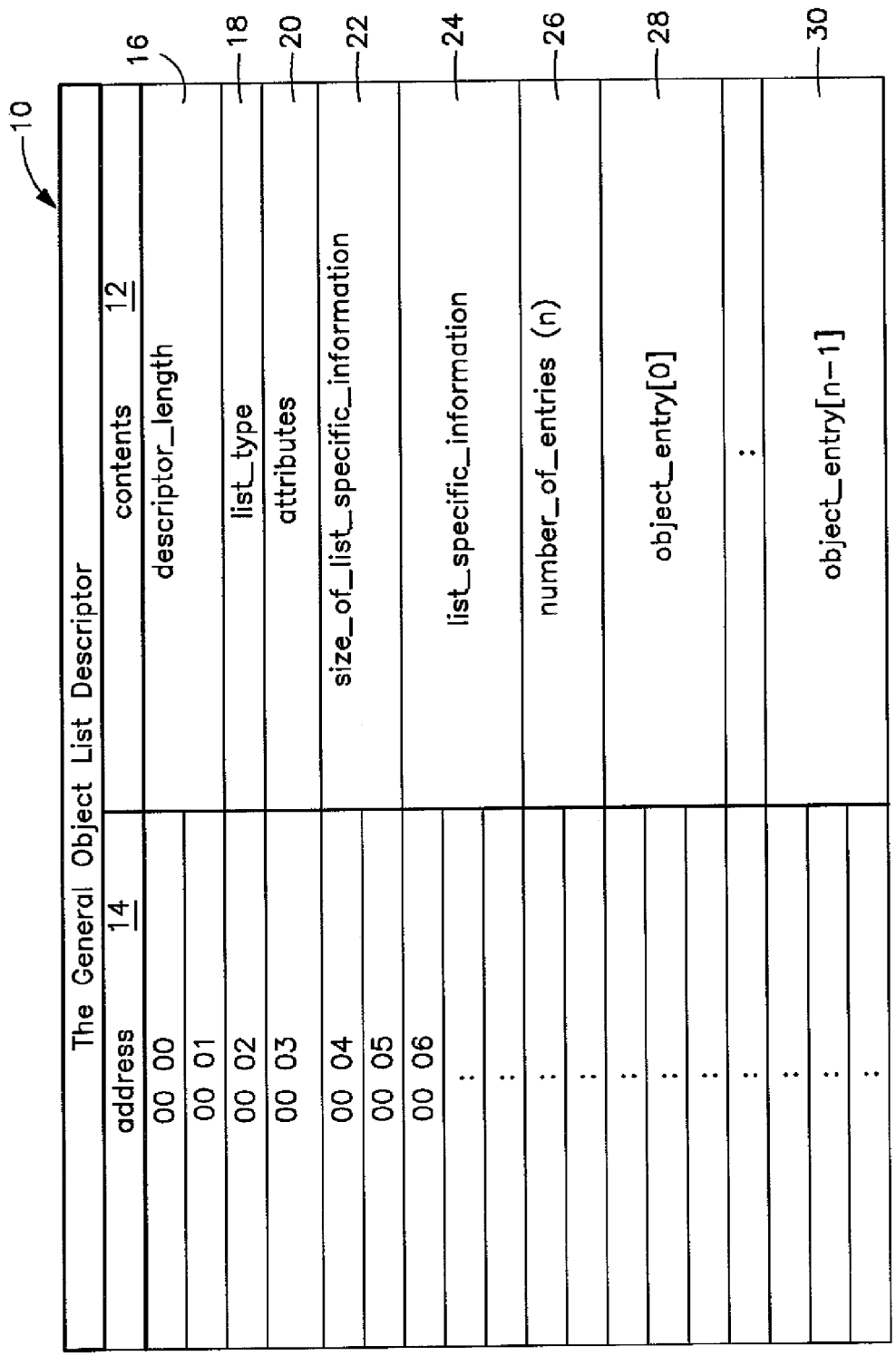
FIG. 2 is a schematic diagram of the general object list descriptor as specified in the AV/C general specification.

Referring now to FIG. 2, a general object list descriptor 10 as prescribed by the General Specification is depicted. It is the goal of the specification that all implementations or methodologies, which manipulate data for such AV/C devices, conform the data to this form for acquisition by other devices. Therefore, a methodology will be described herein below which provides enhanced acquisition of data from such general object list descriptors for devices enabled therewith and which may thereafter recompile any manipulated data back into such a prescribed format. As can be seen in FIG. 2, a plurality of fields or registers 12 are indicated along with specified numeric addresses 14. Each of the fields 12, such as descriptor_length 16, list_type 18, attributes 20, size_of_list_specific_information 22, list_specific_information 24, number_of_entries(n) 26, and the corresponding entries, object_entry[0] 28 to object_entry [n−1] 30, serves a separate and distinct purpose. Furthermore, the data contained in such entries may be static or dynamic, and may also be readable and/or writable by another device. As may be gleaned from FIG. 2, for a device to read information from a lower level object entry, it may become quite cumbersome to do so by referring to the beginning address [00 00] and working downward to the entry as may be initially attempted, but for the following disclosure.

Generally speaking, the descriptor_length field contains the number of bytes, which follow in this object list structure. The list_type field indicates what kind of list this is. The attributes field contains bit flags, which indicate attributes that pertain to the entire list structure. The size_of_list_specific_information field specifies the number of bytes used for the following list_specific_information field. The list_specific_information field contains information that is specific to a particular list_type. The number of entries field contains the number of entries in this list. The object_entry fields are object entries.

Figure 3:
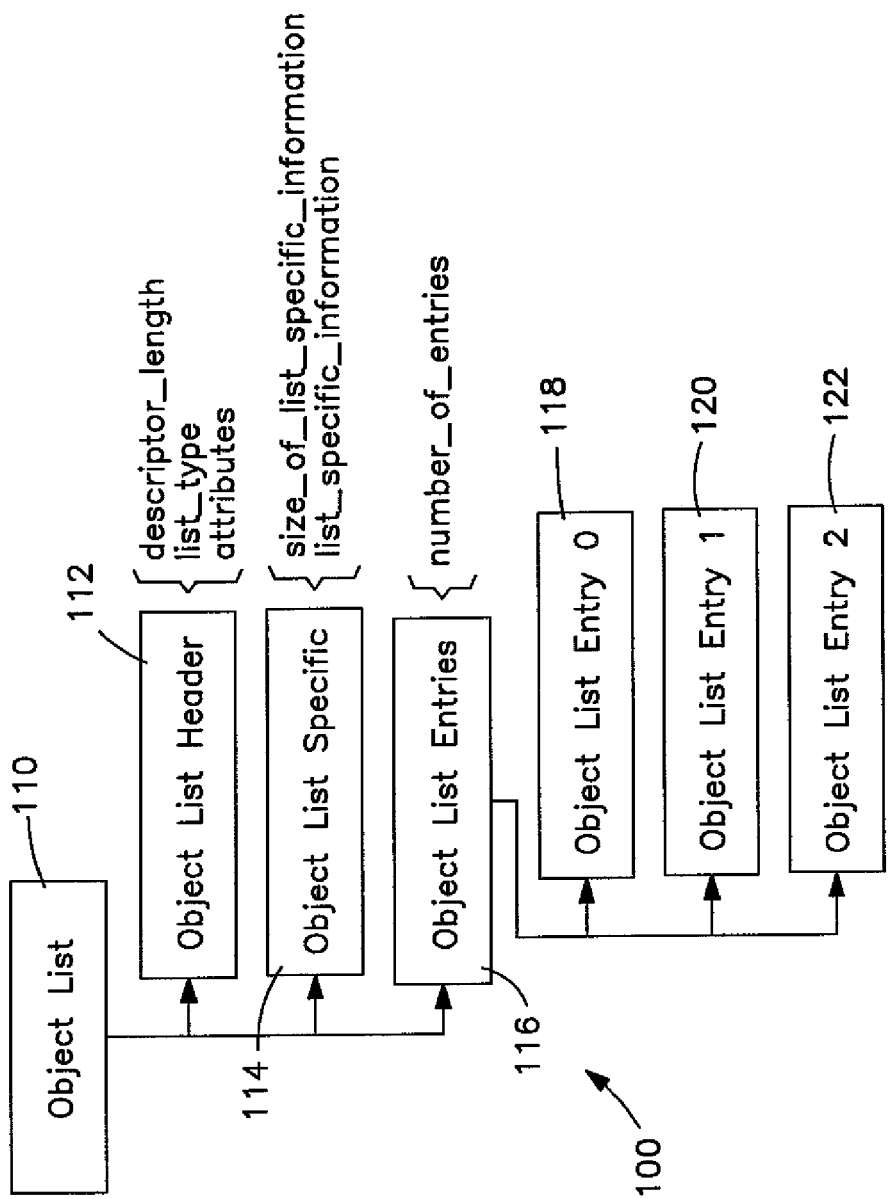
FIG. 3 is a hierarchical flowchart of the decomposition of the AV/C general specification general object list descriptor into containers as indicated by the present invention.

Referring now to FIG. 3, a preferred embodiment of an object list 100 is indicated. The general object list descriptor has been deconstructed into a plurality of containers 110-122. The object list container 110 includes, in this example, an object list header container 112, an object list specific container 114, and an object list entries container 116. Furthermore, the object list entries container 116 includes three object list entry containers 118, 120, 122. The object list header container 112 includes three of the fields that were previously represented in the general object list descriptor, including, descriptor_length, list_type, and attributes. Therefore, should a device wish to determine this higher level type information, it need only access this container 112 to so be imparted with such information without the necessity of accessing any other containers.

Likewise, the object list specific container 114 includes the size_of_list_specific_information field and the list_specific_information field and the object list entries container 116 includes the number_of_entries field. By being able to individually access the object list entries field 116, one can determine immediately the number of objects included therebelow. In this exemplary FIG. 3, the number_of_entries is 3, and hence, object list entry container 0 118, object list entry container 1 120, and object list entry container 2 122, lie thereunder. As indicated above, each object list entry container includes a plurality of similar descriptor fields for the particular object in question.

By, thus deconstructing the general object list descriptor into several individual containers, the data held in those containers may more readily be obtained and manipulated. That is, instead of having to drill down through the FIG. 2 hierarchy to get to specified object_entry data, a device may now direct its attention to the requisite container and obtain the information necessary. It should be noted that such object list descriptor information is maintained preferably in a memory space such as a ROM or EEPROM, but other similar memory means may be utilized without departing from the spirit of this disclosure. Further, the memory space is preferably in operative communication with a processing means, such as a microprocessor.

Having now thus described the container hierarchy to be utilized in this system, it is clear that accessing data via these containers will be far more useful, especially where the data is changing dynamically and rapidly. That is, suppose object list entry container 2 122 includes data regarding a CD track that is playing. If one had to access the FIG. 2 object list descriptor as a whole while reading data from object list entry 2, then while so reading, the list is held open and may preclude other devices from opening other objects at this same time. That is simply unacceptable for many high throughput, fast access, multi-tasking applications. In the FIG. 3 hierarchy, one can now see that container 122 may be accessed while, advantageously, not disturbing any other containers.

Figure 1:
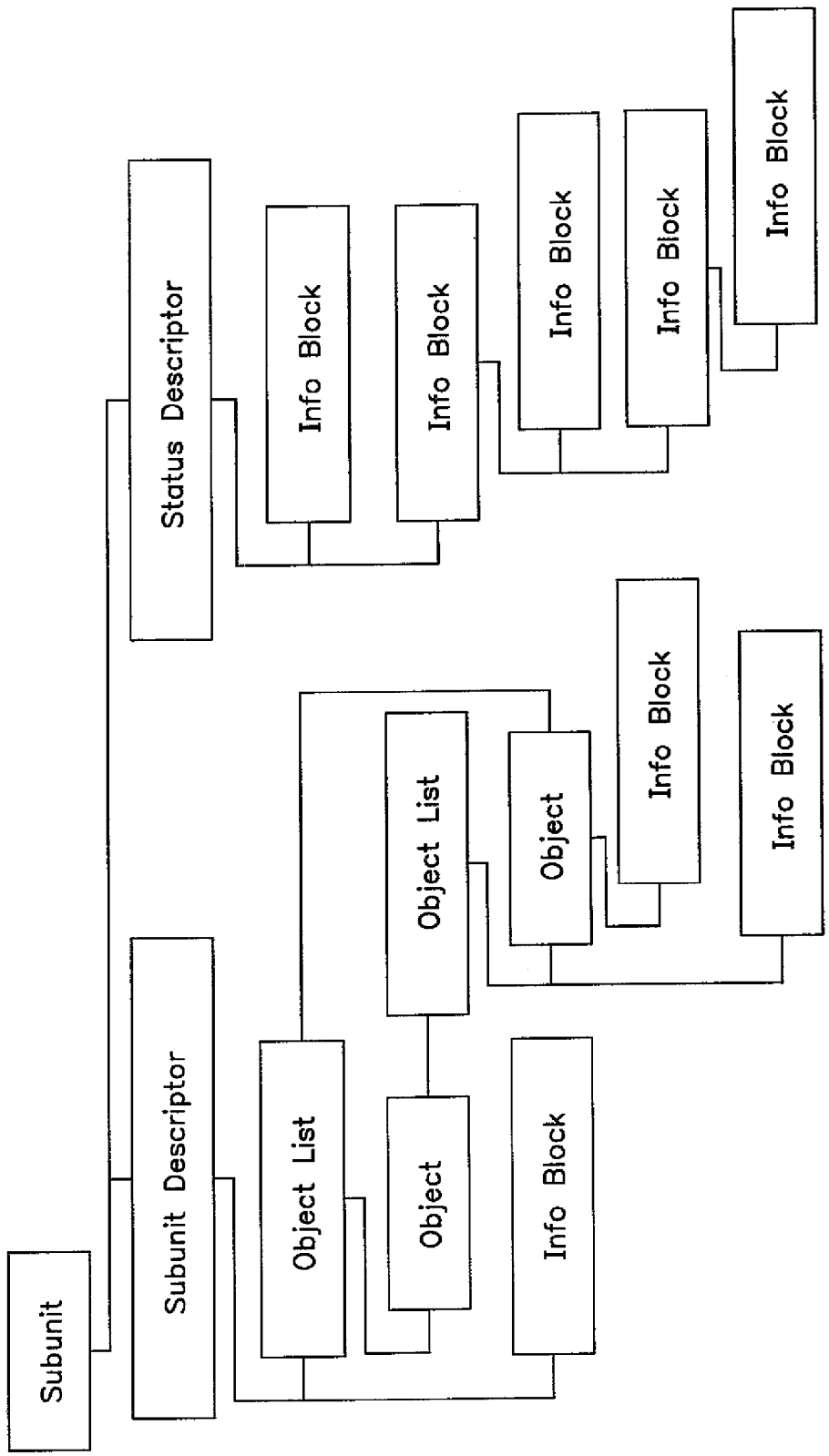
FIG. 1 is a flowchart of an illustrative prior art AV/C General Specification Subunit/Descriptor hierarchy.
Figure 4:
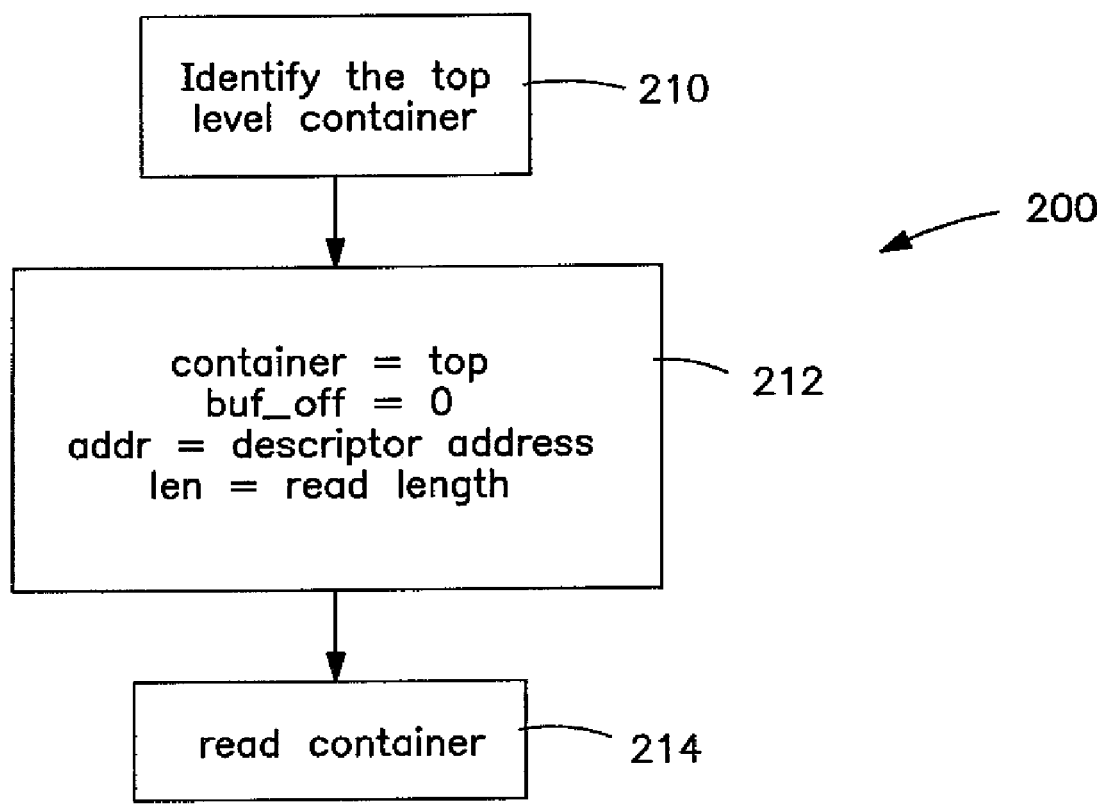
FIG. 4 is a flowchart of a method of the present invention for handling a read descriptor command.

A device now enabled with such a container system will also need to be accessed by other devices utilizing the general object list descriptor architecture of FIGS. 1 and 2. Hereafter will be described a method for so providing such information requested by such a device in the format desired, namely, the prescribed general object list descriptor format. Referring now to FIG. 4, and upon receipt of a prescribed read descriptor command, the target device enabled by this container system will first identify the top level container of the system as indicated by box 210 of the general read descriptor flowchart 200. Once the top level container is identified, certain initial settings will be established in accordance with the read descriptor command received from the controller device as indicated in box 212. That is, a read buffer will be established and the initial read buffer offset address will be set to zero. In this manner, the appropriate descriptor information sought by the controller may be built in this newly established buffer. The target will also acquire the descriptor address being sought by the controller from the read descriptor request sent by the controller along with the string length of the data sought, sent by the controller as a read length. That is, the request sent by the controller, conforming to the general standard, will include the starting descriptor address sought and the length of the data string to be read. Put another way, and referring now to FIG. 2, a controller may wish to read the descriptor indicated therein starting at address 00 00 for a length of 4 bytes. That would mean that the controller wished data within fields 00 00 to 00 03. This container system must thus provide that requested data to the controller.

Figure 5:
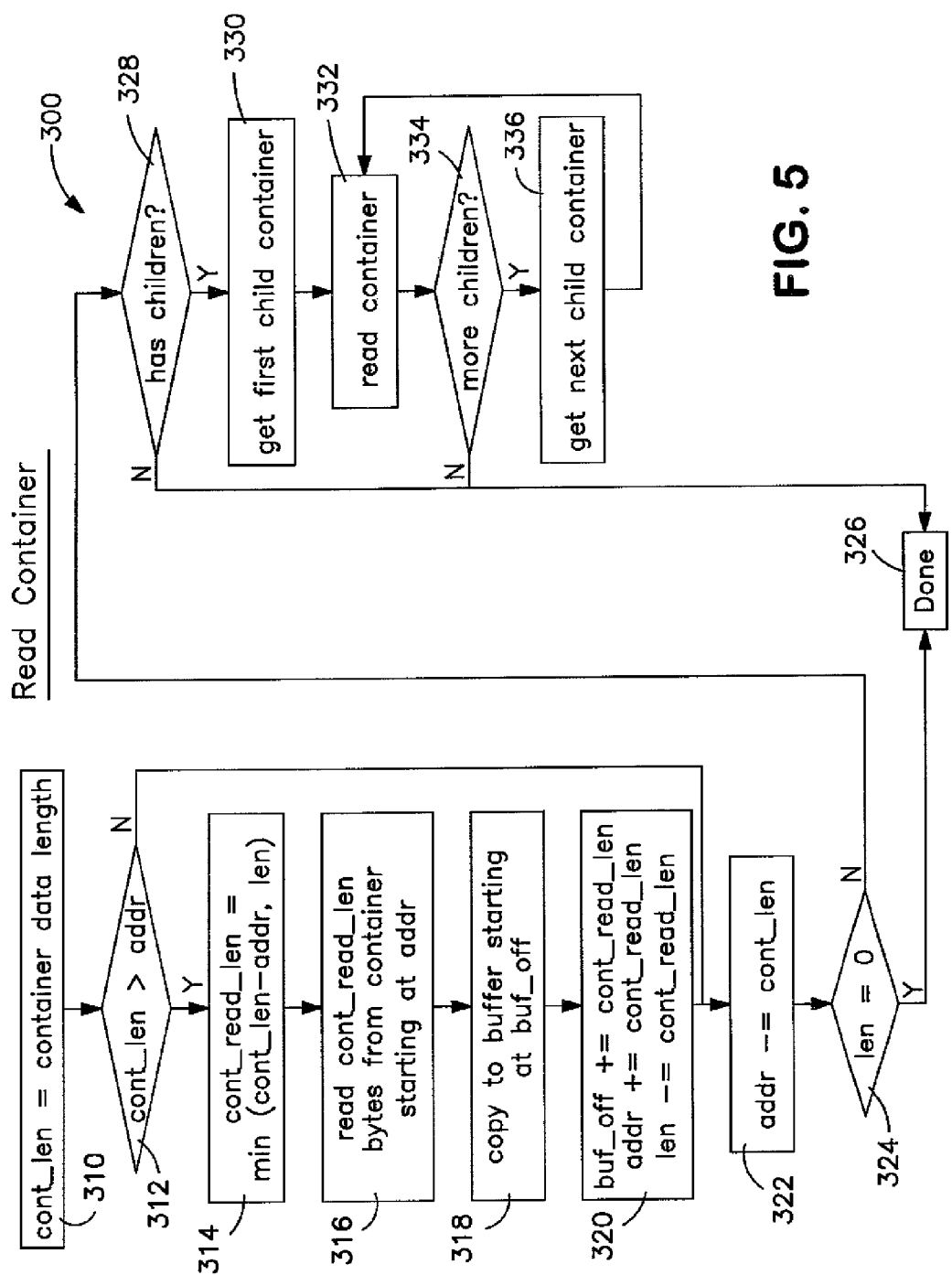
FIG. 5 is a flowchart of a method of the present invention for reading a container.

Once these parameters are established, the data may be read from the appropriate container or containers as in box 214 and compiled in the previously mentioned read buffer form for transmission to the requesting controller. Referring now to FIG. 5, a method 300 for reading the appropriate container data is depicted. This method includes starting at the top container and first setting the container length (cont_len) to the length of the container data fields as is known for the each container as in block 310. That is, if the length of the first parent container is 20 bytes, then cont_len is set initially to 20. Next, that cont_len is compared to the value of the descriptor address (which is now addr, see FIG. 4) as in block 312. If the container length is greater than the address, then data needs to be read from this first container. If the cont_len is less than or equal to addr, then the starting address is not within this container but starts, perhaps in the next container, which will be checked in a similar fashion (described below).

Assuming that cont_len is greater than addr, something is in the first container to read. Thus, the next activity is to set a new variable, cont_read_len equal to the minimum of cont_len less addr, or len as in block 314. That is, at this point we now know that the starting address is within this container and we must now read either all the necessary data, if it all lies within this container (len), or all the data in this container starting from the initial requested address to the end of the container (any remaining data that needs to be read will be described below). Then, a number of bytes equal to cont_read_len (either all data desired or data to end of the container) will be read starting at the desired address as in block 316. This data will then be copied into a read buffer (and will be augmented, if necessary, with more data from child containers) as in block 318. Referring now to block 320, the buffer offset must now be incremented in an amount equal to cont_read_len (the amount of data read into the read buffer). The starting address, addr, must also be incremented by the amount of cont_read_len (this is where the next reading will start). The length of the string to be read will now also be decreased by cont_read_len (since that much has just been read, and only the decremented amount remains).

Then, since the process is preparing to inquire into the child containers of the container that was just read from, and the parent container is limited in length (20 bytes in the above mentioned example), addr must be decremented by cont_len (the container length) as in block 322. This also applies, when the container length is not greater than the initial addr. That is, if at block 312, cont_len was less than addr, it was understood that the address requested was not in the container being checked. Therefore, in either case the next question is whether the next child container must be checked. If all requested data has been gathered, the answer is no. If all requested data has not been gathered, then the answer is yes. Put another way, if len is equal to zero, all of the requested data has been read into the read buffer as in block 324. Otherwise, the process must continue with any remaining children until all of the requested and available data has been read into the read buffer.

As alluded to above, the next question is, if the process has not already read all requested data, are there any children to read from as in block 328? If there are no more children, but the requester sought more data, only the available data will be provided as already read into the read buffer and we are again at block 326 and done. If, on the other hand, more child containers exist, each will be read in turn in a like manner until all requested data is read or no more containers are available as in blocks 330-336.

Figure 6A:
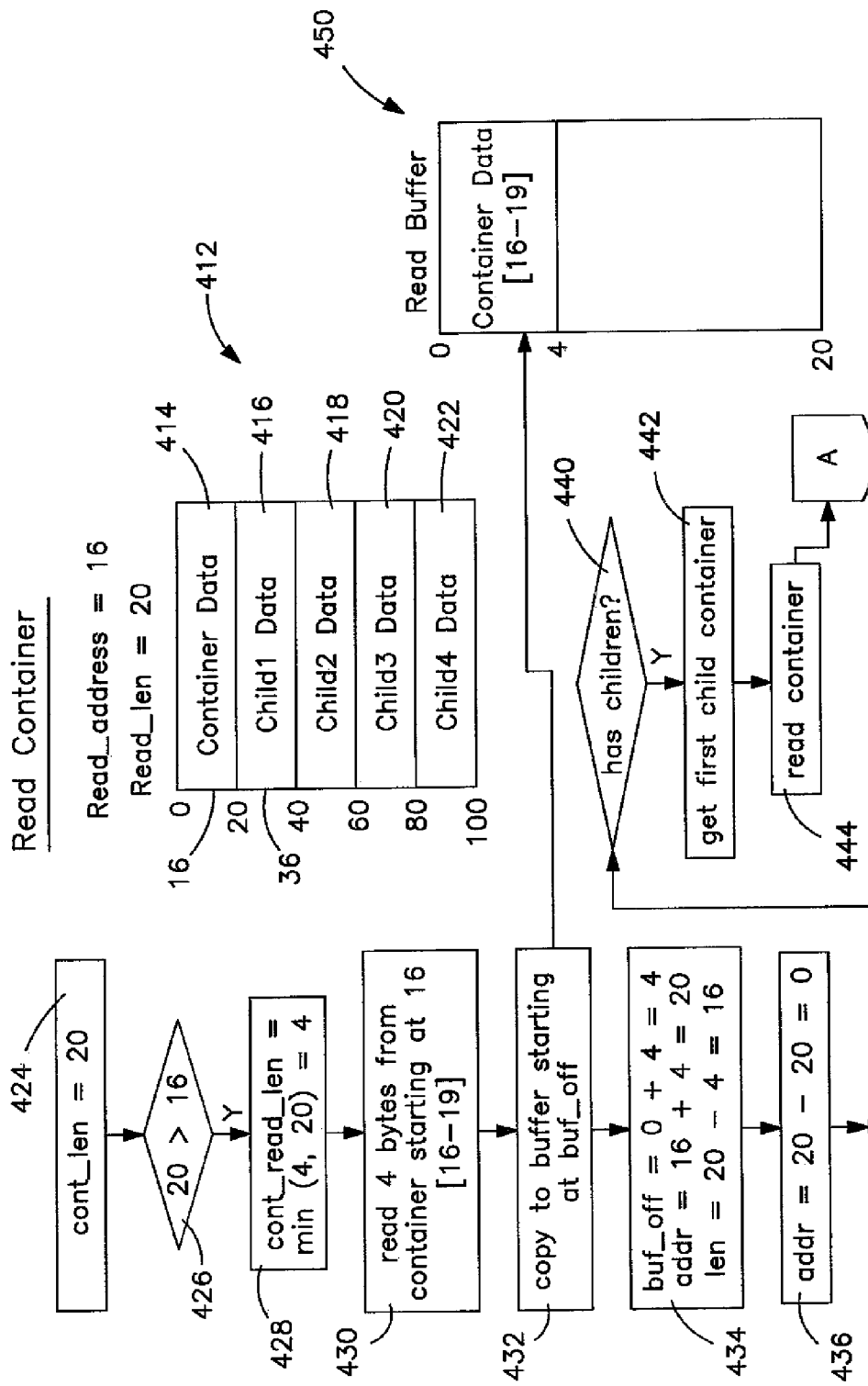
FIG. 6A is a first exemplary flowchart of an application of a method of the present invention.
Figure 6B:
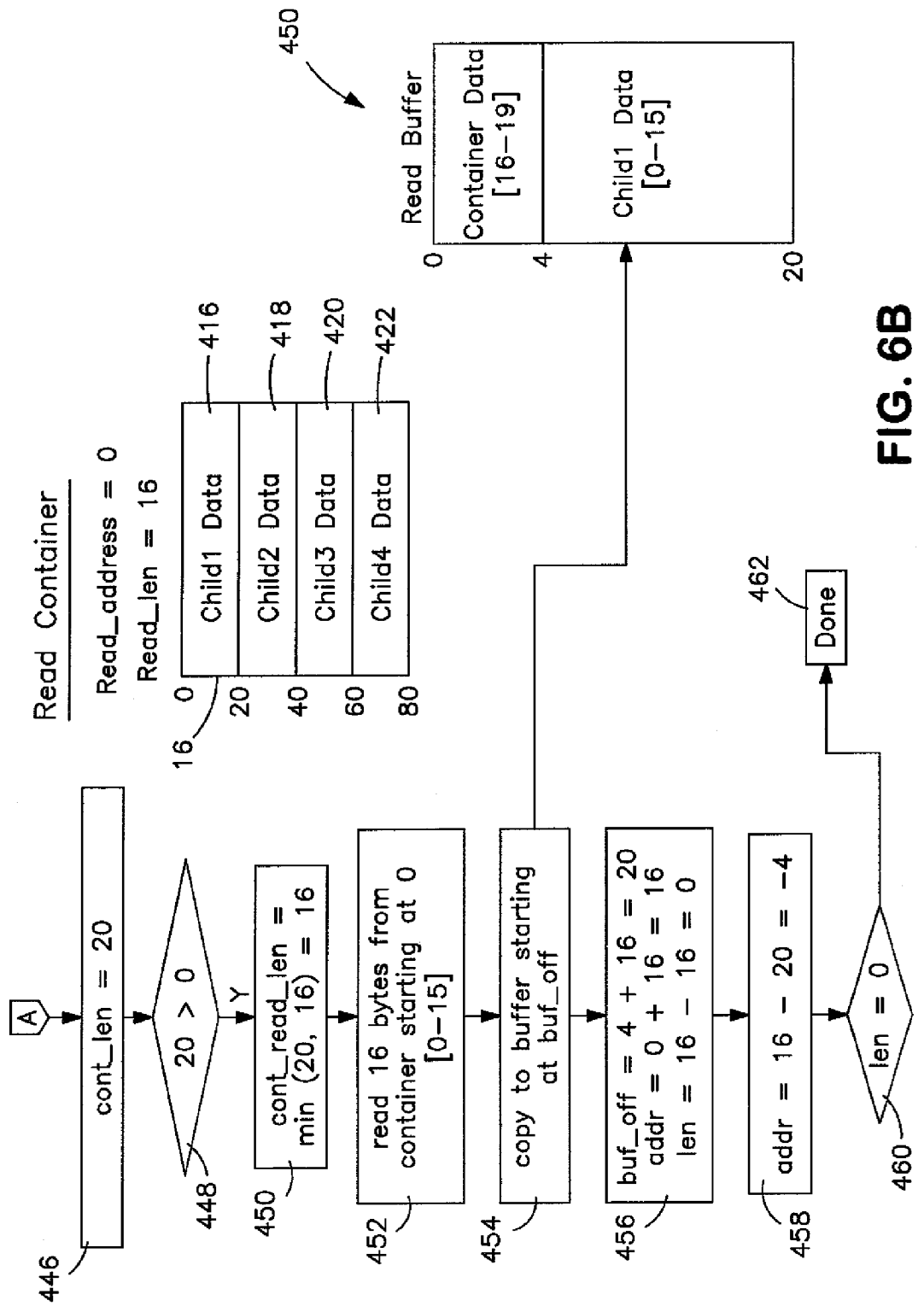
FIG. 6B is a continuation of the exemplary flowchart of FIG. 6A.

To better illustrate this process, a first example is provided in FIGS. 6A and 6B. Referring now to FIG. 6A, it will be assumed that a controller has sent a read descriptor request for a starting address of 16 and for a length of 20 bytes. Although the requestor understands the general specification, the requestor does not understand this container process, but has sent a request assuming the target would understand the prescribed general object list descriptor. Therefore, the target must gather the data requested as though it maintained that data in accordance with the specified general object list descriptor. In this example, the containers 412 include a parent container 414, which includes four child containers 416, 418, 420, and 422. Each container is 20 bytes in length. Thus, the parent container 414 includes addresses 0 to 19, the first child container 416 includes addresses 20 to 39, the second child container 418 includes addresses 40 to 59, the third child container 420 includes addresses 60 to 79, and the forth child container 422 includes addresses 80 to 99.

Therefore, starting at the top container, the read buffer offset is initially set to zero, addr is set to be equal to the descriptor address (16 in this example), and len is set to the length to be read (20 in this example), and the container read process may commence. As indicated, the first container length is 20 bytes, thus cont_len is set at 20 as in block 424. The container length, cont_len 20, is compared to addr, the descriptor read address at this point, which is 16 as in block 426. Since 20 is greater than 16, or put another way, the start address is within the parent container, data must be read from this container and the process proceeds to the next activity.

Now it must be determined how much data to read from this container as in block 428. There are two possibilities: all the requested data can be read from this container, or all the data from this starting address to the end of the container must be read. In this example, the latter situation is implicated. Thus, cont_read_len is equal to the lesser of the cont_len (20) less addr (16), which equals 4, or len, which equals 20. The lesser is then 4. This means that there are 4 bytes to be read from this container 414 starting at address 16 and ending at address 19 as in block 430. That data is then copied into the read buffer 450 as in block 432. Referring now to block 434, the buffer offset must now be adjusted by 4 due to this new data, as well as addr being incremented by 4 since 4 bytes have been taken care of now, and the length, len, must be deceased by 4 since 4 bytes have been read into the buffer. Since we are also at the end of the container, the new starting address should not be 20, but zero, as each container stands alone and independent of the others as in block 436. That is, although the general object list descriptor model may include consecutive addressing, the container system, as explained above, includes independently accessible containers. Thus, once the end of one container is reached, the process must prepare itself for the start of the next container, which will be zero. Next, if the length had been just 4 bytes the process would be done; since 4 bytes are in the buffer. However, in this example, the requested read length was 20, so 16 more bytes, if available must be read. Furthermore, since this first container has children, the process moves on to the first child to read that container as in blocks 438, 440, 442, and 444.

Referring now to FIG. 6B, the process goes back to the beginning with the newly calculated values indicated above (starting address=0 and length yet to be read=16). Again, this first child container is 20 bytes in length [0-19] as in block 446. Since the container length (20) is greater than the starting address (0) (there is data to read in this container) as in block 448, it must be decided whether to read all the data in this container or some lesser necessary amount as in block 450. In this example, since only 16 bytes are left in the request, only 16 bytes need be read from this container and not the entire 20. Therefore, data from addresses 015 are read (block 452) and copied (block 454) into the read buffer 450 sequentially following the previously read parent container data. Thus, a 20 byte read buffer has been constructed with the data requested by the requester and in a form understood by the requestor (a sequential data list). This read buffer is now ready to be read by the requestor. The remainder of the blocks 456-460 lead to the ultimate "done" block 462.

Figure 7A:
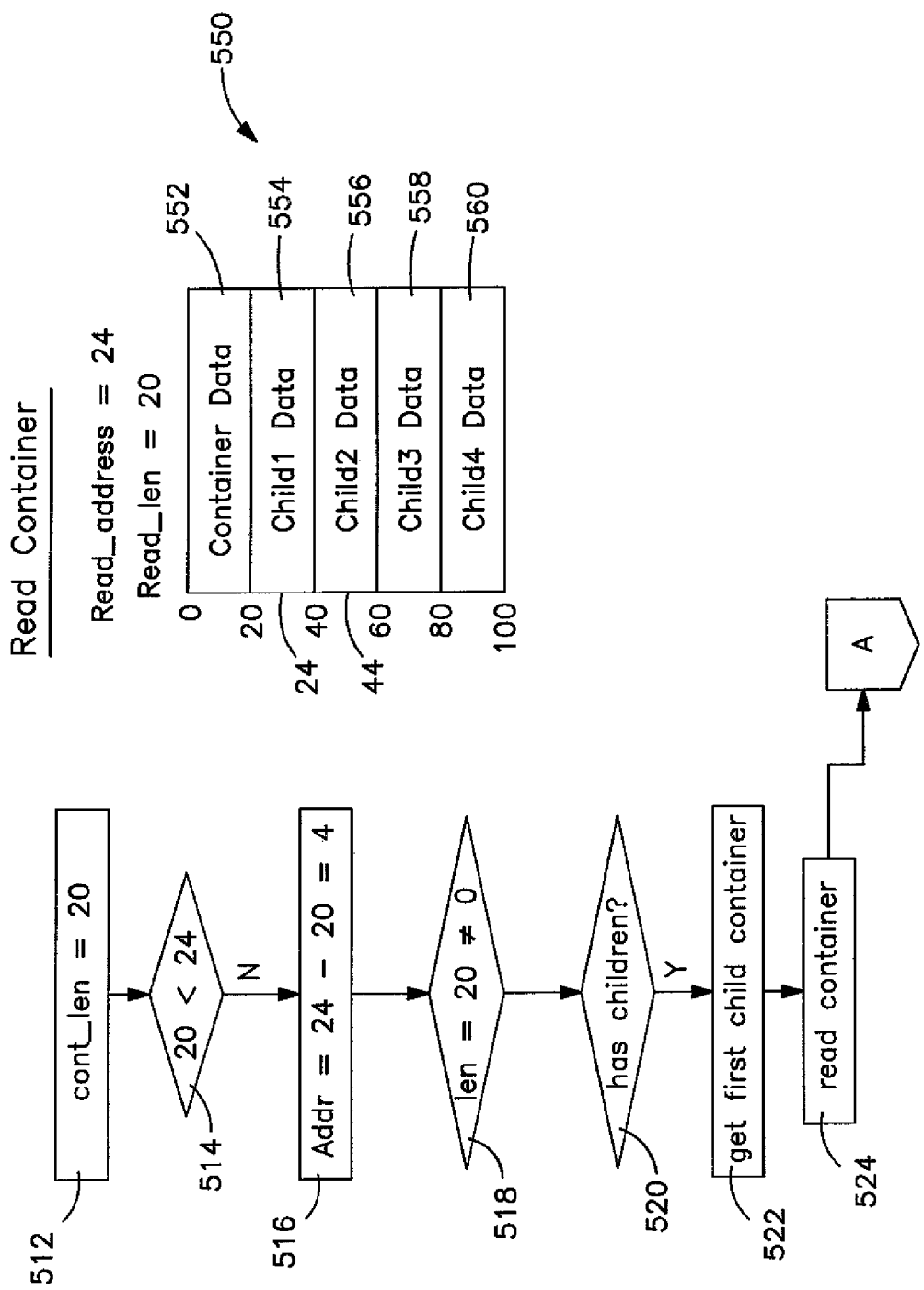
FIG. 7A is a second exemplary flowchart of an application of a method of the present invention.
Figure 7B:
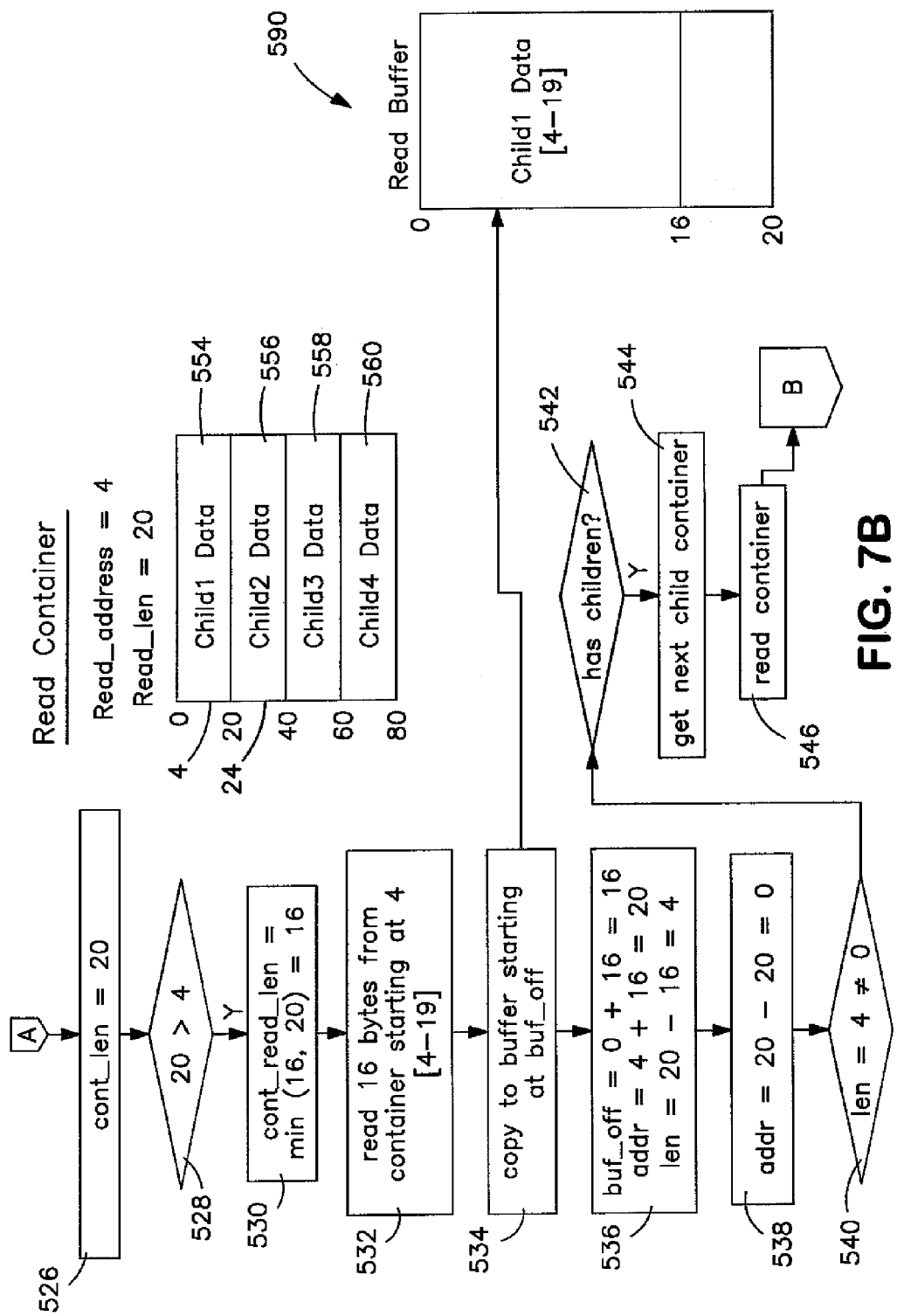
FIG. 7B is a continuation of the second exemplary flowchart of FIG. 7A.
Figure 7C:
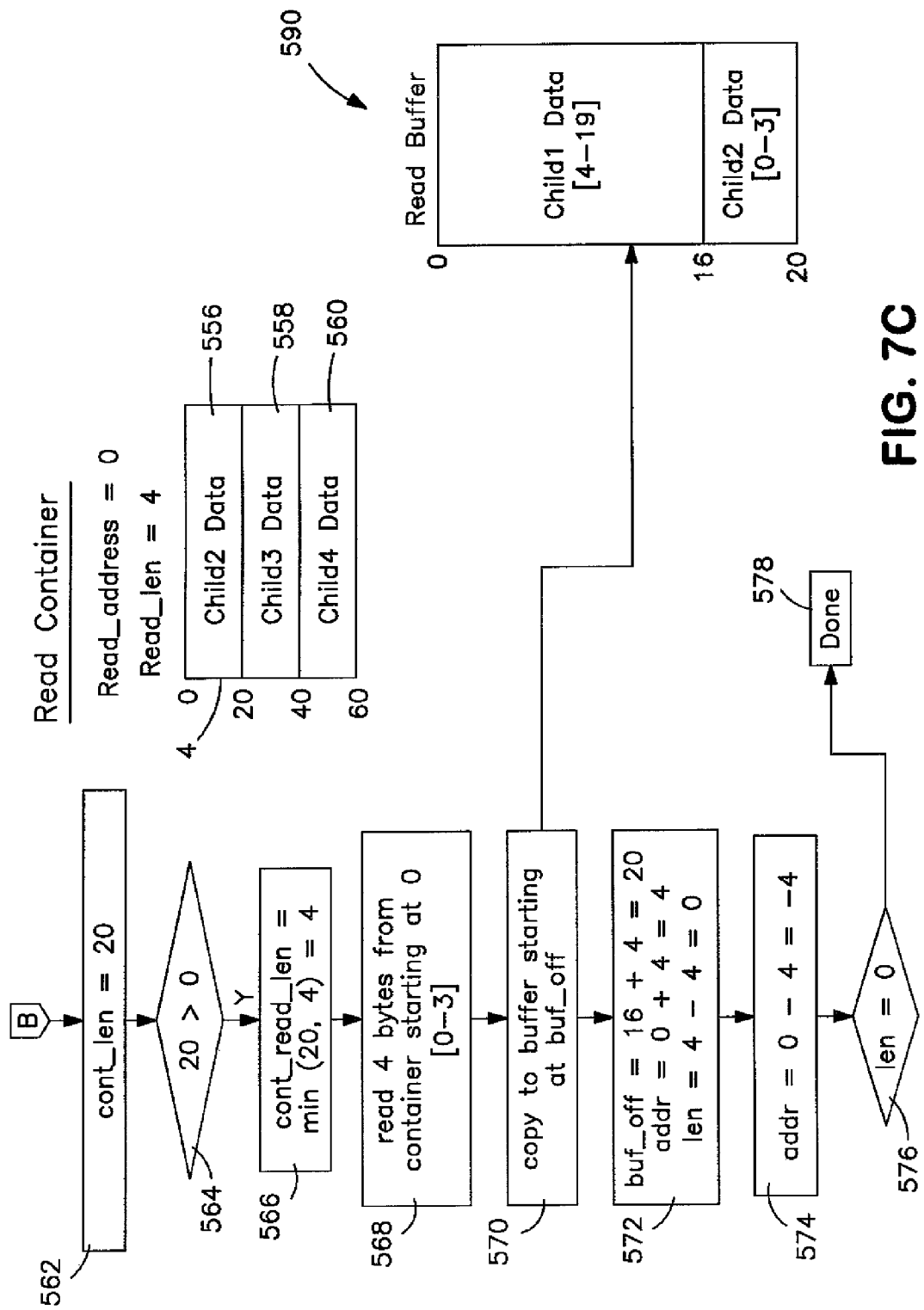
FIG. 7C is a continuation of the exemplary flowchart of FIG. 7B.

Turning now to FIGS. 7A, 7B, and 7C, a second example of this process will be illustrated. In this example, a requestor device is seeking a 20 byte string starting at address 24. Again, the containers are all 20 bytes in length. Therefore, as can be seen in FIG. 7A, the requested data is in the first and second child containers 554 and 556 of 550. The process, however, starts at the top container 552, as it has not yet determined this fact. The buffer offset is again set to zero, addr is set to the start address (24), and len is set to the read length (20). An attempt is then made to read the parent container 552. However, in this example, the starting address is greater than this first container length (from block 512), and thus outside the parent container as in block 514. The process then decrements addr by the container length, thus making the starting address shift according to the container size as in block 516. In this instance, since the original starting address was 24 and the parent container was 20 bytes long, the new starting address sought will be 4. Further, since no data has yet been read, the length sought is still 20 as in block 518. So then the question is, are there any children to read from as in block 520? As there are children in this example, the process gets the first child container and starts over as in blocks 522 and 524.

Referring now, then, to FIG. 7B, a similar attempt to read the first child container will be made. Here, as the new address (addr) is 4, which is less than the container length (from block 526), there is data to be read from this container (as in block 528). How much, is the next question. Can all 20 bytes sought be read from this container or may only a string to the end of the container be read as in block 530? In this example, the 16 bytes of data from address 4 to the end of the container may only be read [4-19]. Thus, those bytes are read (block 532) and copied into the buffer 590 at offset zero (block 534). Referring now to block 536, since 16 bytes were read into the buffer, the buffer offset is incremented by 16. Likewise, the starting address is incremented by 16 from 4 to 20. But the length of data yet to be read is decreased by 16 to 4. Furthermore, the address is also decreased by the container length making the new starting address for the next container (assuming one exists) now zero as in block 538. As more data has been requested (len=4≠0) as in block 540 and there is another child container 542, the process starts again with that next child container.

Referring now to FIG. 7C, then, the child2 container 556 is 20 bytes in length as in block 562 which is greater than the start address (0), so the data available must be read as in block 564. How much? The lesser of the amount available in the child2 container 556 (20 bytes) and the amount left in the request (4 bytes) as in block 566. Thus, 4 bytes is read from the child2 container 556 starting at 0 [0-3] as in block 568 and copied to the read buffer 590 starting at the buffer offset (16) as in block 570. As this fulfills the request (len=0), the process is completed and the read buffer may now be read by the requesting device as in blocks 572, 574, 576, and 578.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An audio visual apparatus, the apparatus configured to support sequential descriptor access and hierarchical descriptor access, the apparatus comprising:
 an interface configured to receive access requests comprising at least a sequential type and a hierarchical type;
 a plurality of containers of audio visual control descriptor data; and
 a non-transitory computer readable storage medium comprising instructions which, when executed:
  if the access request comprises the sequential type:
   identify one or more initial settings;

present one or more of the plurality of containers of audio visual control descriptor data in a sequential fashion in accordance with the one or more identified initial settings; and sequentially access the audio visual control descriptor data; and if the access request comprises the hierarchical type:
present a header identifying a logical hierarchy of containers;

wherein the apparatus is configured so that individual ones of the plurality of containers can be accessed to access a portion of the audio visual control descriptor data without accessing all of the audio visual control descriptor data.

2. The apparatus of claim 1, further comprising a storage memory, the plurality of containers being stored in the storage memory.

3. The apparatus of claim 2, further comprising a sequential buffer.

4. The apparatus of claim 3, wherein the presentation of the one or more of the plurality of containers of audio visual control descriptor data comprises writing at least a first portion of the storage memory to the sequential buffer.

5. The apparatus of claim 1, wherein the one or more initial settings includes a length of access.

6. The apparatus of claim 5, wherein the sequential access type is configured to return a contiguous portion of audio visual control descriptor information, the contiguous portion having a length that does not exceed the length of access.

7. The apparatus of claim 6, wherein the contiguous portion comprises a whole number of containers.

8. The apparatus of claim 1, wherein the apparatus is configured to receive, responsive to receiving the header, a second access request to specify one or more of the containers, the second access request comprising an index value.

9. The apparatus of claim 8, wherein the apparatus is configured to, responsive to receiving the second access request, return the container specified by the index value.

10. The apparatus of claim 1, wherein the interface is further configured to receive access requests comprising a second hierarchical access type, the second hierarchical access type additionally requiring an index value; and the medium further comprises instructions which when executed, access only the container specified by the index value if the access request comprises the second hierarchical type.

11. The apparatus of claim 1, wherein the interface operates according to a high-speed serialized bus protocol.

12. The apparatus of claim 11, wherein the interface provides plug-and-play capability.

13. A media apparatus, the apparatus configured to support a plurality of different descriptor access types, the apparatus comprising:

an interface configured to receive access requests comprising at least a first type and a second type;

a plurality of containers of media control descriptor data; and a non-transitory computer readable storage medium comprising instructions which, when executed:

(i) if the access request comprises the first type, then: identify one or more initial settings;

present one or more of the plurality of containers of media control descriptor data in a first scheme in accordance with the one or more identified initial settings; and access the media control descriptor data according to the first scheme; and (ii) if the access request comprises the second type:
present a header identifying a second scheme associated with the containers;

wherein the apparatus is configured so that individual ones of the plurality of containers can be accessed to access a portion of the media control descriptor data without accessing all of the media control descriptor data.

14. The apparatus of claim 13, wherein the first scheme comprises a sequential access scheme, and the second scheme comprises a substantially hierarchical scheme.

15. The apparatus of claim 13, the apparatus further comprising:

a storage memory, the plurality of containers being stored in the storage memory; and a sequential buffer.

16. The apparatus of claim 15, wherein the presentation of the one or more of the plurality of containers of media control descriptor data additionally comprises writing at least a first portion of the storage memory to the sequential buffer.

17. The apparatus of claim 13, wherein the one or more initial settings includes a length of access, and the first access type is configured to return a contiguous portion of media control descriptor information, the contiguous portion having a length that does not exceed the length of access.

18. The apparatus of claim 17, wherein the contiguous portion comprises a whole number of containers.

19. The apparatus of claim 13, wherein the apparatus is configured to receive, responsive to receiving the header, a second access request to specify one or more of the containers; and where the second access request comprises an index value.

20. The apparatus of claim 19, wherein the apparatus is configured to, responsive to receiving the second access request, return the container specified by the index value.

21. The apparatus of claim 13, wherein:

the interface is further configured to receive access requests comprising a third access type having a third scheme associated therewith, the third access type additionally requiring an index value; and the medium further comprises instructions which when executed, access only the container specified by the index value if the access request comprises the third type.

22. The apparatus of claim 21, wherein the second and third schemes each comprise substantially hierarchical schemes.

23. The apparatus of claim 13, wherein the interface operates according to a high-speed serialized bus protocol.

24. The apparatus of claim 13, wherein the interface provides plug-and-play capability.

25. A media apparatus, the apparatus configured to support a plurality of different descriptor access types, the apparatus comprising:

processing apparatus;

an interface in data communication with the processing apparatus and configured to receive access requests comprising at least a first type and a second type;

a storage device in data communication with the processing apparatus and configured to store a plurality of containers of media descriptor data thereon; and first logic configured to, for access requests of the first type:

identify one or more settings;

present one or more of the plurality of containers of media descriptor data according to a first scheme and the one or more identified settings; and access the media descriptor data according to the first scheme; and second logic configured to, for access requests of the second type, present a data structure identifying a second scheme associated with the containers;

wherein the apparatus is configured so that individual ones of the plurality of containers can be accessed to access a portion of the media descriptor data without accessing all of the media descriptor data.

26. The apparatus of claim 25, wherein the interface operates according to a high-speed serialized bus protocol.

27. The apparatus of claim 26, wherein the interface provides plug-and-play capability.

28. A method for supporting non-blocking access to a plurality of objects by one or more requesting devices, the method comprising:

providing first information corresponding to a plurality of containers, each container comprising one or more objects;

receiving a first access request, the first access request comprising a first index, the first index being configured to address a first container;

receiving a second access request, the second access request comprising a second index, the second index being configured to address a second container;

accessing a first one or more objects from the first container;

accessing a second one or more objects from the second container, the first and second containers not precluding access to one another; and providing the first and second requested one or more objects to the one or more requesting devices.

29. The method of claim 28, wherein the objects comprise one or more audio visual descriptors.

30. The method of claim 28, wherein the first information corresponding to the plurality of containers comprises a first number of containers.

31. The method of claim 30, wherein the first and second index is configured to address one or more containers within the first number of containers.

32. The method of claim 31, where the one or more objects of the containers are hierarchically organized.

33. The method of claim 32, further comprising: responsive to receiving a request for a second information corresponding to the first container, providing the second information corresponding to a plurality of objects within the first container.

34. The method of claim 33, wherein the second information corresponding to the plurality of objects comprises a second number of objects.

35. The method of claim 34, further comprising: responsive to receiving a third access request comprising a third index configured to address a first object, accessing the first object from the first container;

wherein the second, and third access requests do not preclude access to one another.

36. The method of claim 35, wherein the third access request is configured to perform concurrently with the first access request.

37. The method of claim 36, wherein the first and third access requests do not preclude access to one another.

38. Apparatus configured to support non-blocking access to a plurality of objects by one or more requesting devices, the apparatus comprising:

processing apparatus;

a data interface in data communication with the processing apparatus;

storage apparatus in data communication with the processing apparatus, the storage apparatus being configured to store a plurality of containers of data thereon; and logic in data communication with the processing apparatus, the logic being configured to:

provide first information corresponding to a plurality of containers, each container comprising one or more objects;

receive a first access request, the first access request comprising a first index, the first index being configured to address a first container;

receive a second access request, the second access request comprising a second index, the second index being configured to address a second container;

access a first one or more objects from the first container;

access a second one or more objects from the second container, the first and second containers not precluding access to one another; and provide the first and second requested one or more objects to the interface for provision to the one or more requesting devices.

* * * * *